United States Patent Office 3,637,688
Patented Jan. 25, 1972

3,637,688
6-(FLUORO AND TRIFLUOROMETHYL PHENYL)-3,5-DIAMINO - 1,2,4 - TRIAZINES AND SUBSTITUTED - 6 - PHENYLALKYL-3,5-DIAMINO-1,2,4-TRIAZINES
Richard W. Rees, Newtown Square, and Peter B. Russell, Villanova, Pa., assignors to American Home Products Corporation, New York, N.Y.
No Drawing. Filed Jan. 9, 1970, Ser. No. 1,842
Int. Cl. C07d 55/10
U.S. Cl. 260—249.9          7 Claims

ABSTRACT OF THE DISCLOSURE

This invention includes but is not limited to compounds of the formula:

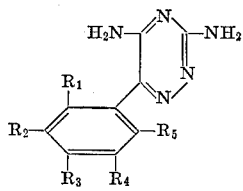

wherein
$R_1$ is selected from the group consisting of hydrogen and fluorine;
$R_2$, $R_3$ and $R_4$ are selected from the group consisting of hydrogen, fluorine and trifluoromethyl;
$R_5$ is hydrogen, with the proviso that at least one member selected from the group consisting of $R_1$, $R_2$, $R_3$ and $R_4$ are always fluorine or trifluoromethyl. The compounds are useful in the treatment of malaria.

DESCRIPTION OF THE PRIOR ART

German Pat. 951,996 describes certain substituted 3,5-diamino-6-phenyl-1,2,4 triazines as useful as antimalarial chemotherapeutic agents.

DESCRIPTION OF THE INVENTION

The invention is concerned with novel compounds of Formula I and Formula I(a)

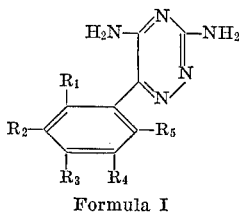

Formula I wherein $R_1$ is selected from the group consisting of hydrogen and fluorine; $R_2$, $R_3$ and $R_4$ are selected from the group consisting of hydrogen, fluorine and trifluoromethyl; $R_5$ is hydrogen, with the proviso that at least one member selected from the group consisting of $R_1$, $R_2$, $R_3$ and $R_4$ is always fluorine or trifluoromethyl.

The invention also includes compounds of Formula I(a):

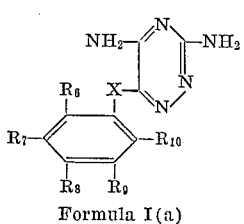

Formula I(a)

wherein $R_6$, $R_7$, $R_8$, $R_9$, $R_{10}$ are independently selected from the group consisting of hydrogen, fluorine, chlorine, bromine, trifluoromethyl, (lower)alkyl and (lower)alkoxy; X is selected from the group consisting of $(CH_2)_n$ and

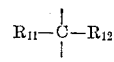

wherein $R_{11}$ and $R_{12}$ are selected from the group consisting of methyl, ethyl and propyl and $n$ is an integer of from two to four.

As used herein the term (lower)alkyl is used to describe straight and branched chain hydrocarbon groups containing one to about six carbon atoms including methyl, ethyl, i-propyl, propyl, butyl, etc. The term (lower)alkoxy is used to include hydrocarbonoxy groups containing one to about six carbon atoms such as methoxy, ethoxy, propoxy, butoxy, etc. The compounds are useful in the treatment of malaria.

The preferred compounds of the invention can readily be prepared by a modified procedure of J. A. Settepani and A. Borkevec, J. Het. Chem., 3, 188–190 (1966) by reacting the appropriate substituted benzoyl cyanide (Ib) with aminoguanidine (II) to form the amidohydrazone (III) which is isolated, as the corresponding nitric acid salt. This salt can then be easily cyclized to the respective 3,5-diamino-1,2,4-triazine in by refluxing the salt in an alkanolic KOH solution. Suitable alkanols include methanol, ethanol and propanol, etc.

3751

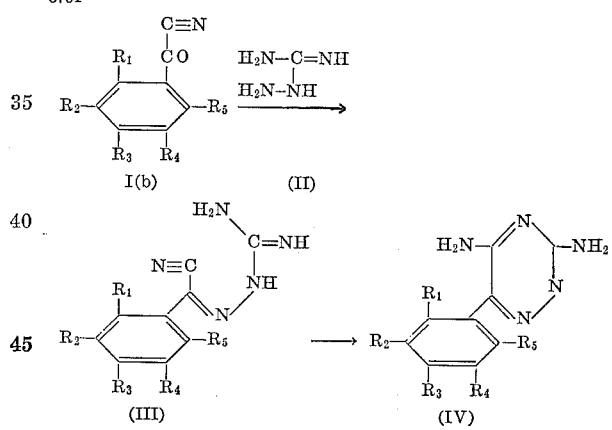

wherein $R_1$, $R_2$, $R_3$, $R_4$ and $R_5$ are the same as hereinabove defined.

The benzoyl nitriles can be prepared by reacting the appropriate benzoyl chlorides with cuprous cyanide according to a modified procedure by T. S. Oakwood and L. A. Weisgerber, Org. Syn. 24, (1944). The compounds of Formula Ia may be prepared by analogous methods. In the preferred compounds of Formula I, a single fluoro substituent can be located in the ortho, meta or para position while two or more substituents can be present in the 2', 3', 4' or 5' position. Of particular interest are the trifluoromethyl substituent in the ring in the meta or para position.

The compounds of the invention are useful as antimalarial chemotherapeutic agents and as such, they may also be employed in experimental and comparative pharmacology. They are effective against Plasmodium bergheii in mice when administered subcutaneously at a dosage level of about 2–640 mg. per kg. of body weight, according to the method of Osdene et al. as reported in J. Med. Chem., vol. 10, pp. 431–434 (1967). The preferred dosage range is about 10–60 mg. per kg. of body weight. The dosage may be adjusted when the compounds are employed in the treatment of the various types of malaria in other mammals and other routes of administration are employed.

The compounds of the invention are less toxic than the related prior art compounds. Thus the novel compounds of the invention may be employed in many situations where the prior art compounds would have to be withdrawn. This unexpected decrease in toxicity is of substantial benefit of many patients afflicted with malaria as therapeutic doses of the compounds may be administered in some cases, which were not amenable to therapy with prior art compounds which had greater toxicity. Moreover, the decrease in toxicity is achieved without diminution of the high anti-malarial activity. Those skilled in the art will readily appreciate the advantages of employing the less-toxic compounds of the invention for prophylactic purposes.

When the compounds of this invention are employed as described above, they may be administered alone or in combination with pharmacologically acceptable carriers, the proportion of which is determined by the chosen route of administration and standard pharmacological practice.

The following examples are included to illustrate but not to limit the scope of the invention.

EXAMPLE 1

Preparation of 3,5-diamino-6-(4'-trifluoromethylphenyl)-1,2,4-triazine

A solution of p-trifluoromethylbenzoylnitrile (6.0 g.) in dimethylsulfoxide (7.1 ml.) is added dropwise to a stirred suspension of aminoguanidine bicarbonate (4.51 g.) in 8 N nitric acid (50 ml.) at 0–5°. The cooling bath is removed and the stirring continued for 16 hours. The desired p-trifluoromethylbenzoyl cyanide amidino hydrazone nitric acid salt is collected by filtration, washed with water until the wash water is neutral, then dried. The compound is then cyclized by refluxing in 10% alcoholic potassium hydroxide (100 ml.), under nitrogen, for one hour. The reaction mixture is cooled, water (50 ml.) added and then vacuum evaporated to remove most of the alcohol. The reaction mixture is filtered, the crystals washed with water, then dried to obtain 2.7 g. of the title compound, M.P. 232–233° C.

EXAMPLE 2

Preparation of 3,5-diamino-6-(3'-trifluoromethylphenyl)-1,2,4-triazine

Using m-trifluoromethylbenzoyl nitrile and following the procedure and quantities as described in the preparation of Example 1, there is obtained 2.6 g. of the title compound, M.P. 199–200° C.

EXAMPLE 3

Preparation of 3,5-diamino-6-(4'-fluorophenyl)-1,2,4-triazine

A solution of p-fluorobenzoyl nitrile (19.3 g.) in dimethyl sulfoxide (23 ml.) is added dropwise to a stirred suspension of aminoguanidine bicarbonate (19.4 g.) in 8 N nitric acid (214 ml.) at 0–5°. The cooling bath is removed and the stirring continued for 16 hours. The desired nitric acid salt of p-fluoro-benzyl cyanide amidino hydrazone is collected by filtration, washed with water until the wash water is neutral, then dried. The compound is then cyclized by refluxing in 10% alcoholic potassium hydroxide (400 ml.), under nitrogen, for one hour. The reaction mixture is cooled, water (200 ml.) added and then vacuum evaporated to remove most of the alcohol. The reaction mixture is filtered, the crystals washed with water, then dried to obtain 9.6 g. of the title compound, M.P. 257–260° C.

EXAMPLE 4

Preparation of 3,5-diamino-6-(2'-fluorophenyl)-1,2,4-triazine

Using o-fluoro benzoyl nitrile and following the procedure as described in the preparation of Example 3, there is obtained 14.1 g. of the title product, M.P. 231–232° C.

EXAMPLE 5

Preparation of 3,5-diamino-6-(3',5'-ditrifluoromethyl phenyl)-1,2,4-triazine

This compound was prepared by the same procedure as Example 1, with the exception that ethyl acetate is used in the cyclization reaction to extract the title compound from the reaction mixture, M.P. 232–245° C.

EXAMPLE 6

The following compounds are prepared by the method of Example 1:

3,5-(diamino-6-(3',4',5'-trifluoromethylphenyl)1,2,4-triazine
3,5-diamino-6-(3',5'-difluorophenyl)1,2,4-triazine
3,5-(diamino-6-(3',4'-ditrifluoromethylphenyl))1,2,4-triazine
3,5-diamino-6-(3',4'-difluorophenyl)1,2,4-triazine
3,5-diamino-6-(2',4'-difluorophenyl)1,2,4-triazine
3,5-diamino-6-(3'-fluorophenyl)1,2,4-triazine
3,5-diamino-6-(3',5'-ditrifluoromethyl-4'-fluorophenyl)1,2,4-triazine
3,5-diamino-6-'(2'-fluoro-4'-trifluoromethylphenyl)1,2,4-triazine.

EXAMPLE 7

3,5-diamino-6-($\alpha,\alpha$-dimethylbenzyl)-1,2,4-triazine)

36.6 g. (0.2 mole) of $\alpha$-phenyl-isobutyryl chloride and 20 g. (0.22 mole) of cuprous cyanide were stirred under nitrogen at 150° for 3½ hours. After cooling, the reaction mixture was slurried in benzene and filtered, washing the filter cake thoroughly with benzene. The combined filtrates were stripped in vacuo and $\alpha$-phenylisobutyryl cyanide was distilled from the oily residue. The yield was 22.7 g. B.P. 75–77° C. (0.5–0.2 mm.).

11.0 g. (0.064 mole) of $\alpha$-phenylisobutyryl cyanide in dimethyl sulfoxide (10 ml.) is added dropwise to a stirred suspension of aminoguanidine bicarbonate (9.5 g. 0.07 mole) in 8 N HNO₃ (110 ml.) at 0°–5° C. When the addition is complete, the cooling bath is removed and stirring is continued for 16 hours. The nitric acid salt of $\alpha$-phenyl-isobutyryl cyanide amidino hydrazone is collected by filtration and washed thoroughly with water. Cyclization is then accomplished according to the method of Example I. The precipitate is collected by filtration, washed with water and dried to give the title compound.

EXAMPLE 8

By procedure analogous to those employed in Example 7, the following compounds are prepared:

3,5-diamino-6-(2',6'-dichlorophenethyl)-1,2,4-triazine
3,5-diamino-6-(4'-trifluoromethylphenethyl)-1,2,4-triazine
3,5-diamino-6-phenpropyl-1,2,4-triazine
3,5-diamino-6-(3',5'-dimethoxyphenethyl)-1,2,4-triazine
3,5-diamino-6-(4'-fluorophenethyl)-1,2,4-triazine
3,5-diamino-6-(3',5'-dimethylphenethyl)-1,2,4-triazine
3,5-diamino-6-(4'-propylphenethyl)-1,2,4-triazine
3,5-diamino-6-(4'-methoxyphenethyl)-1,2,4-triazine
3,5-diamino-6-(4'-ethylphenbutyl)-1,2,4-triazine
3,5-diamino-6-(4'-bromophenethyl)-1,2,4-triazine
3,5-diamino-6-(4'-ethoxyphenethyl)-1,2,4-triazine
3,5-diamino-6-(4'-trifluoromethylphenpropyl)-1,2,4-triazine
3,5-diamino-6-(4'-trifluoromethylphenbutyl)-1,2,4-triazine 3,5-diamino-6-(3′,4′-ditrifluoromethylphenethyl)-
1,2,4-triazine
3,5-diamino-6-(3′,5′-difluorophenethyl)-1,2,4-triazine
3,5-diamino-6-(4′-propoxyphenethyl)-1,2,4-triazine

What is claimed is:
1. A compound of the formula

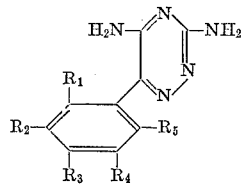

wherein
$R_1$ is selected from the group consisting of hydrogen and fluorine;
$R_2$, $R_3$ and $R_4$ are selected from the group consisting of hydrogen, fluorine and trifluoromethyl;
$R_5$ is hydrogen, with the proviso that at least one member selected from the group consisting of $R_1$, $R_2$, $R_3$ and $R_4$ is always fluorine or trifluoromethyl.

2. A compound as described in claim 1 which is 3,5-diamino-6-(4′-trifluoromethyl-phenyl)-1,2,4-triazine.
3. A compound as described in claim 1 which is 3,5-diamino-6-(3′-trifluoromethylphenyl)-1,2,4-triazine.
4. A compound as described in claim 1 which is 3,5-diamino-6-(4′-fluorophenyl)-1,2,4-triazine.
5. A compound as described in claim 1 which is 3,5-diamino-6-(2′-fluorophenyl)-1,2,4-triazine.
6. A compound as described in claim 1 which is 3,5-diamino-6-(3′,5′-ditrifluoromethylphenyl)-1,2,4-triazine.
7. 3,5-diamino-6-(α,α-dimethylbenzyl)-1,2,4-triazine.

References Cited
FOREIGN PATENTS
951,996  11/1956  Germany _____ 260—294.9

JOHN M. FORD, Primary Examiner

U.S. Cl. X.R.
424—249; 260—465 E